United States Patent [19]
Kobata et al.

[11] Patent Number: 6,060,416
[45] Date of Patent: May 9, 2000

[54] PREPOLYMERIZED SOLID CATALYST, PROCESS FOR PREPARING THE SAME, AND PROCESS FOR HETEROGENEOUS POLYMERIZATION OF OLEFINS

[75] Inventors: Atsuo Kobata; Tetsuhiro Matsumoto, both of Yamaguchi, Japan

[73] Assignee: Mitsui Chemicals, Tokyo, Japan

[21] Appl. No.: 09/196,220

[22] Filed: Nov. 20, 1998

Related U.S. Application Data

[62] Division of application No. 08/917,605, Aug. 26, 1997, Pat. No. 5,939,345.

[30] Foreign Application Priority Data

Aug. 27, 1996 [JP] Japan ................................. 8-224982
Jun. 9, 1997 [JP] Japan ................................. 9-151039

[51] Int. Cl.$^7$ ........................................ B01J 37/34
[52] U.S. Cl. ........................... 502/5; 502/108; 502/117; 502/152; 526/132; 526/160; 526/943; 526/904; 526/351; 526/352
[58] Field of Search ........................ 502/5, 108, 117, 502/152; 526/132, 160, 943, 904, 351, 352

[56] References Cited

U.S. PATENT DOCUMENTS 5,719,095  2/1998  Brekner et al. .

OTHER PUBLICATIONS

Abstract of Japanese Laid Open Application Publication No. 62–297302 (Dec. 24, 1987), Patent Abstracts of Japan, vol. 12, No. 191 (C–501) (1988).

*Primary Examiner*—David W. Wu
*Assistant Examiner*—Ling-Siu Choi

[57] ABSTRACT

A high-performance prepolymerized solid catalyst is prepared by polymerizing an olefin onto an olefin polymerization catalyst in a heterogeneous system under irradiation with an elastic wave, wherein the olefin is prepolymerized in an amount of not less than 0.1 g based on 1 mmol of a transition metal contained in the olefin polymerization catalyst. The elastic wave is preferably an ultrasonic wave. In a process for heterogeneous polymerization of an olefin, an olefin is subjected to slurry polymerization or gas phase polymerization in the presence of the prepolymerized solid catalyst. In a process for heterogeneous polymerization of an olefin, an olefin may be polymerized onto the olefin polymerization catalyst in a heterogeneous system under irradiation with an elastic wave to prepare polyolefin. Therefore, the heterogeneous polymerization of an olefin can be stably conducted and polyolefins of uniform property and high quality can be obtained.

3 Claims, 1 Drawing Sheet

PREPOLYMERIZED SOLID CATALYST, PROCESS FOR PREPARING THE SAME, AND PROCESS FOR HETEROGENEOUS POLYMERIZATION OF OLEFINS

CROSS-REFERENCE TO RELATED APPLICATIONS

This application is a divisional of application Ser. No. 08/917,605, filed Aug, 26,1997 now U.S. Pat. No. 5,939,345.

FIELD OF THE INVENTION

The present invetnion relates to high-performance prepolymerized solid catalysts and a process for preparing the catalysts. The invention also relates to a process for heterogeneous polymerization of olefins, by which polyolefins of high quality can be obtained.

BACKGROUND OF THE INVENTION

A solution polymerization process in which polymerization is conducted in a liquid phase homogeneous system, a slurry polymerization process in which polymerization is conducted in a solid-liquid heterogeneous system, and a gas phase polymerization process in which polymerization is conducted in a gas-solid heterogeneous system have been hitherto known as processes for producing polyolefins. Of these processes, the solution polymerization process (homogeneous polymerization process) is known to provide polyolefins of high quality, but this process is not always excellent economically because the size of the reactor tends to be enlarged or a large-scale recovery and purification equipment for solvent is necessary.

On the other hand, in the heterogeneous polymerization process such as the slurry polymerization process or the gas phase polymerization process, the recovery and purification equipment for solvent is unnecessary or it can be made extremely small scale, so that polyolefins can be produced simply and efficiently, resulting in economical advantages.

In the polymerization of olefins, transition metal compounds containing transition metals such as titanium and zirconium are generally employed as catalyst components. However, if the catalyst components are used as they are in the heterogeneous polymerization system, string-like polyolefin may be produced or the resulting polyolefin may adhere to a wall surface of the reactor to cause unfeasibility of operations. In such cases, it becomes difficult to perform stable polymerization.

These problems can be solved by previously forming a solid catalyst wherein the catalyst components are supported on a particulate carrier, such as silica, having a particle diameter of not less than a certain value (generally about several tens $\mu$m) and using the catalyst for the reaction. However, when the catalyst components are supported on the particulate carrier, the catalytic effectiveness is sometimes decreased to lower the catalytic activity.

In the heterogeneous polymerization using the solid catalyst, the reactive monomer (olefin) penetrates and diffuses into the solid polymer containing the polymerization catalyst components and undergoes reaction. In some cases, however, the monomer diffuses ununiformly toward the active sites of the polymerization catalyst in the solid polymer to cause ununiform distribution of monomer concentration. As a result, it becomes difficult to obtain polyolefins of uniform properties, and the resulting polyolefins are generally inferior in the quality to those obtained by the homogeneous polymerization.

As for the polymerization solid catalyst for use in the heterogeneous polymerization, it is known that polyolefin of uniform particle property is obtained if a polymerization catalyst of uniform particle property is used.

In the heterogeneous polymerization, therefore, it is desired to easily obtain solid catalysts having small particle diameters and excellent particle property. By the use of such solid catalysts in the heterogeneous polymerization, the polymerization can be stably achieved, and besides polyolefins of high quality and uniform particle property can be obtained. Therefore, development of such solid catalysts is of industrially great value.

Under such circumstances as mentioned above, the present inventors have earnestly studied olefin polymerization solid catalysts. As a result, they have found that, when an olefin is prepolymerized onto an olefin polymerization catalyst in a heterogeneous system under irradiation with an elastic wave, a high-performance prepolymerized solid catalyst can be easily obtained without adhesion of polyolefin to the wall surface of a reactor in the prepolymerization process or without production of string-like polyolefin. The present inventors have further found that use of the prepolymerized solid catalyst in a slurry polymerization process or a gas phase polymerization process makes it possible to perform stable polymerization and to obtain polyolefin of uniform property and high quality. Based on the above finding, the present invention has been accomplished.

OBJECT OF THE INVENTION

It is an object of the present invention to provide a high-performance prepolymerized solid catalyst, a process for preparing the prepolymerized solid catalyst, and a process for heterogeneous polymerization of an olefin by which heterogeneous polymerization of an olefin can be stably conducted.

SUMMARY OF THE INVENTION

The process for preparing a prepolymerized solid catalyst according to the present invention comprises polymerizing an olefin onto an olefin polymerization catalyst in a heterogeneous system under irradiation with an elastic wave.

The prepolymerized solid catalyst according to the present invention is prepared by prepolymerizing an olefin onto an olefin polymerization catalyst in a heterogeneous system under irradiation with an elastic wave. In the prepolymerized solid catalyst, the olefin is prepolymerized in an amount of not less than 0.1 g based on 1 mmol of a transition metal contained in the olefin polymerization catalyst.

The elastic wave is preferably an ultrasonic wave, and it is preferable that the reaction system is irradiated with an ultrasonic wave having a frequency of 1 to 1,000 kHz in such a manner that the intensity of the ultrasonic wave on the inside wall surface of a polymerization reactor becomes not less than 0.01 W/cm$^2$.

In the process for heterogeneous polymerization of an olefin according to the present invention, an olefin is subjected to slurry polymerization or gas phase polymerization in the presence of the above-mentioned prepolymerized solid catalyst.

In the process for heterogeneous polymerization of an olefin according to the present invention, an olefin is polymerized onto an olefin polymerization catalyst in a heterogeneous system under irradiation with an elastic wave to prepare polyolefin.

Figure 1:
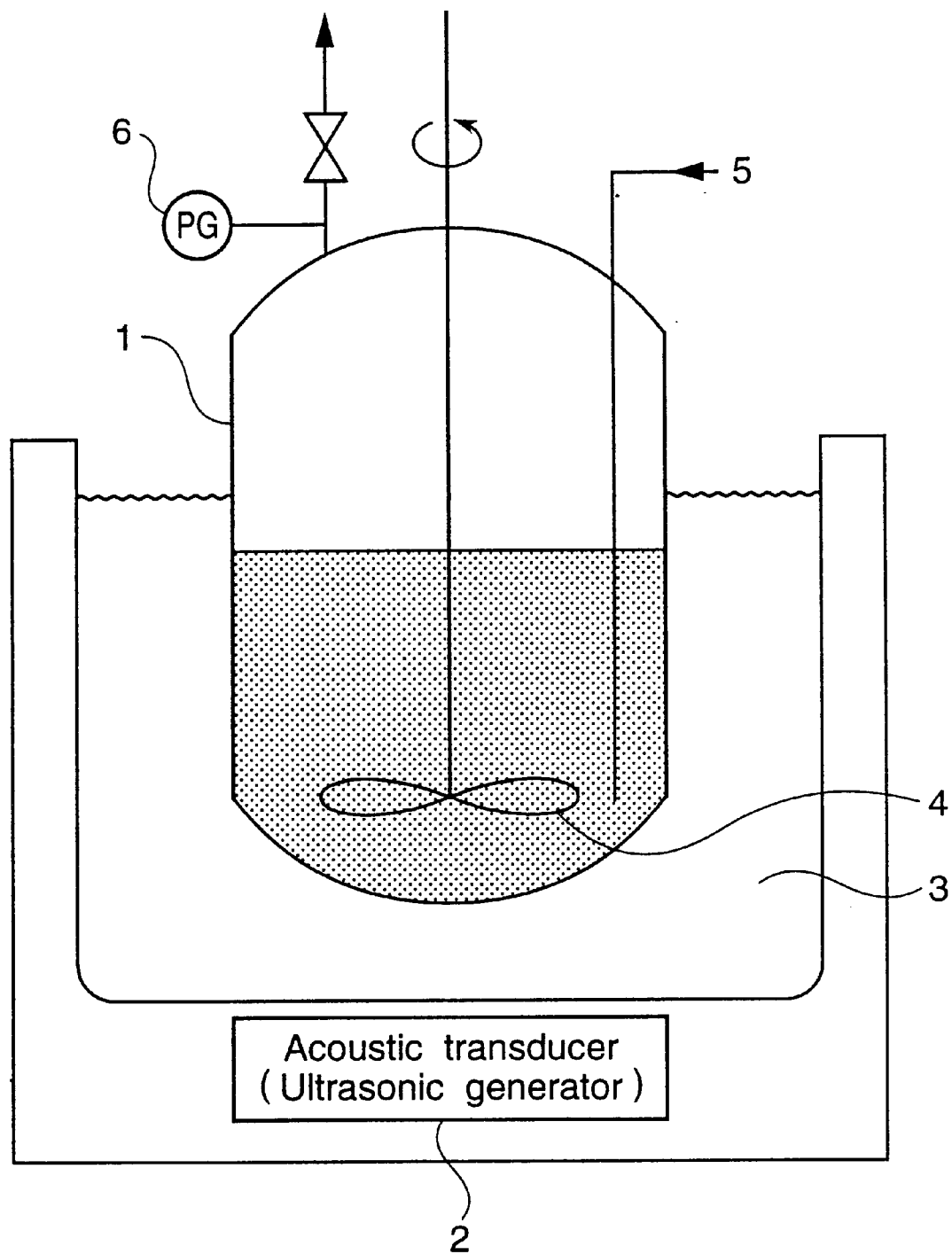
FIG. 1 shows an embodiment of the process for preparing a prepolymerized solid catalyst according to the present invention, wherein an acoustic transducer (ultrasonic generator) is provided outside the reactor.

1: reactor
2: acoustic transducer (ultrasonic generator)
3: water bath
4: stirring blade
5: reactive monomer feed pipe
6: pressure gauge

DETAILED DESCRIPTION OF THE INVENTION

The prepolymerized solid catalyst, the process for preparing the catalyst and the process for heterogeneous polymerization of an olefin according to the invention are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

Prepolymerized Catalyst and Process for Preparing the Same

In the process for preparing a prepolymerized catalyst according to the invention, an olefin is polymerized onto an olefin polymerization catalyst in a heterogeneous system under irradiation with an elastic wave.

The elastic wave used for the irradiation in the present invention means elastic vibration propagated through an elastic body. The elastic wave generally is a longitudinal wave by which compression or expansion is conveyed in the traveling direction of the wave, but the elastic wave is sometimes present as a transverse wave on a reactor wall, a contact surface with the wave, and the like.

In the present invention, any waves known as elastic waves are employable without specific limitation, but generally used are sound waves, particularly an ultrasonic wave.

Specifically, an ultrasonic wave having a frequency of 1 to 1,000 kHz, preferably 10 to 500 kHz, particularly preferably 20 to 300 kHz, is available as the elastic wave.

It is desired that the irradiation with the elastic wave of the above frequency is carried out in such a manner that the intensity of the wave on the inside wall surface of the reactor becomes not less than 0.01 W/cm$^2$, preferably not less than 0.05 W/cm$^2$, particularly preferably 0.07 to 100 W/cm$^2$.

The intensity of the ultrasonic wave was measured in the following manner.

Water which is used in a model experiment, i.e. a simulated liquid, was introduced into a reactor and then irradiated with an ultrasonic wave. In this state, the sound pressure in the reactor was measured by a sound pressure meter (TYPE 1501 manufactured by Kaijo K.K., using a probe of UTSP-60 and a cable of USC-150). The measurement of the sound pressure was made at room temperature and atmospheric pressure. From the measured sound pressure, the intensity of the ultrasonic wave was calculated by the following equation:

$$I = P^2/\rho c$$

wherein I is an intensity of the ultrasonic wave, P is a sound pressure, $\rho$ is a density of the medium (water), and c is an ultrasonic wave velocity in the medium.

In the present invention, the reaction system may be irradiated with the above-mentioned elastic wave from a vibration plane provided outside the reactor, or may be directly irradiated with the elastic wave from a vibration plane provided inside the reactor.

FIG. 1 shows an embodiment of the process for preparing a prepolymerized solid catalyst according to the invention, wherein an acoustic transducer (ultrasonic generator) is provided outside the reactor.

When the elastic wave is transmitted by a wall of the reactor 1 or the like, the elastic wave is easily attenuated because of transmission loss (proportion of energy of transmitted wave to energy of incident wave at the point of measurement), and therefore in the irradiation with the elastic wave from a vibration plane (ultrasonic generator 2) provided outside the reactor, the elastic wave is markedly attenuated by the reactor wall. Further, with increase of the distance from the vibration source, the elastic wave is more attenuated.

On this account, when the reaction system is irradiated with the elastic wave from the outside of the reactor, the reactor preferably has such a structure that the transmission loss caused by the reactor wall does not take place. Moreover, it is desired that the shape of the reactor, conditions of an elastic wave intensity on the vibration plane, arrangement of the vibration plane and the number thereof are taken into consideration so that the desired intensity of the elastic wave is obtained in the region of the lowest intensity of the elastic wave in the reactor.

For example, as shown in FIG. 1, a reactor 1 is placed in a water bath 3, and the reaction system may be irradiated, by way of the aqueous phase, with an ultrasonic wave generated by an acoustic transducer (ultrasonic generator) 2.

There is no specific limitation on the shape of the reactor, and for example, a vessel reactor or a tubular reactor may be used.

In the case of a tubular reactor having a double tube structure, the thickness of a tube used as the reaction field can be made small. Especially when the outer tube is used as the reaction field, attenuation of the elastic wave can be further decreased. The reaction tube may be in a shape of a loop.

Generation of the elastic wave by a vibration plane provided inside the reactor is advantageous in view of energy, because attenuation caused by the reactor wall can be avoided. In order to generate the elastic wave in the reactor, the generator itself may be provided inside the reactor.

When the generator does not have a function of explosion-proof, the generator may be provided outside the reactor to introduce the elastic wave into the reactor through a horn.

The number of generators may be either singular or plural. It is desired that the number of generators is increased with enlargement of the reactor size so that the whole polymerization system is able to be uniformly irradiated with the elastic wave. When plural generators are used, the arrangement of the generators and the irradiation directions are desired to be taken into consideration so that the attenuation caused by the interference of the elastic waves (stationary waves) with each other does not take place.

Since the elastic wave has a function of stirring and mixing the polymerization system, a stirring blade 4 shown in FIG. 1 may be used or may not be used, regardless of the shape of the reactor.

Examples of the olefins to be prepolymerized under irradiation with the elastic wave in the present invention include α-olefins of 2 to 20 carbon atoms, such as ethylene, propylene, 1-butene, 1-pentene, 1-hexene, 4-methyl-1- pentene, 1-octene, 1-decene and 1-dodecene. These α-olefins may be homopolymerized or copolymerized. In the present invention, styrene may also be used for polymerization.

The olefin may be copolymerized with non-conjugated dienes, if needed. Examples of the non-conjugated dienes include cyclic dienes, such as 5-ethylidene-2-norbornene, 5-propylidene-2-norbornene, dicyclopentadiene and 5-vinyl-2-norbornene; and chain non-conjugated dienes, such as 1,4-hexadiene, 5-methyl-1,5-heptadiene, 6-methyl-1,5-6-methyl-1,7-octadiene and 7-methyl-1,6-octadiene.

Further, the olefin may be polymerized with aromatic vinylidene monomers, if needed. The aromatic vinylidene monomers are represented by the formula $CR_2=CR-Ph$ (wherein each R is independently hydrogen or methyl, and Ph is a phenyl group or a p-alkyl substituted phenyl group which may have a halogen substituent). Of the aromatic vinylidene monomers, preferable are aromatic vinylidene (vinyl) monomers having hydrogen as R in the above formula. Particularly preferable is styrene.

In the present invention, a transition metal catalyst component and a co-catalyst component are used as the olefin polymerization catalyst in the preparation of the prepolymerized solid catalyst.

The transition metal catalyst component used herein is a transition metal compound [A] containing a transition metal selected from Group IVB of the periodic table. The transition metal compound [A] is represented by, for example, the following formula (i):

$$ML_x \qquad (i)$$

wherein M is a transition metal selected from Zr, Ti, Hf, V, Nb, Ta and Cr; L is a ligand coordinated to the transition metal, specifically, a hydrogen atom, a halogen atom, an oxygen atom, a hydrocarbon group of 1 to 30 carbon atoms which may have a substituent, an alkoxy group, an aryloxy group, a trialkylsilyl group or a $SO_3R$ group (R is a hydrocarbon group of 1 to 8 carbon atoms which may have a substituent such as halogen); and x is a valence of the transition metal.

Examples of the halogen atoms include fluorine, chlorine, bromine and iodine.

Examples of the hydrocarbon groups of 1 to 30 carbon atoms include alkyl groups, such as methyl, ethyl, propyl, isopropyl and butyl; cycloalkyl groups, such as cyclopentyl and cyclohexyl; aryl groups, such as phenyl, tolyl and cyclopentadienyl; and aralkyl groups, such as benzyl, neophyl and fluorenyl.

The cycloalkyl groups, aryl groups and aralkyl groups may be substituted in part with halogen atoms, alkyl groups and trialkylsilyl groups.

When plural hydrocarbon groups selected from cycloalkyl groups, aryl groups and aralkyl groups are coordinated, they may be bonded through an alkylene group, such as ethylene or propylene, a substituted alkylene group, such as isopropylidene or diphenylmethylene, a silylene group, or a substituted silylene group, such as dimethylsilylene, diphenylsilylene or methylphenylsilylene.

Examples of the alkoxy groups include methoxy, ethoxy and butoxy.

Examples of the aryloxy groups include phenoxy.

In the present invention, the above transition metal compounds [A] may be used singly or in combination of two or more kinds as the transition metal catalyst component, or they may be used together with halogenated hydrocarbon.

The transition metal compound can be fed to the prepolymerization system as it is, but it may be fed together with a particulate carrier compound after contacted with the carrier compound, provided that the effect of the invention is not reduced.

Examples of the carrier compounds include inorganic compounds, such as $SiO_2$, $Al_2O_3$, $B_2O_3$, $MgO$, $ZrO_2$, $CaO$, $TiO_2$, $ZnO$, $Zn_2O$, $SnO_2$, $BaO$, $MgCl_2$ and $NaCl$; and resins, such as polyethylene, polypropylene, poly-1-butene, poly-4-methyl-1-pentene and a styrene/divinylbenzene copolymer. These carriers may be used in combination of two or more kinds.

If the carrier is used in the present invention, the particle diameter of the carrier present in the prepolymerization system is desired to be small. Especially when the mean particle diameter of the resulting polyolefin is controlled, the particle diameter of the carrier is desired to be small. In this case, the particle diameter of the carrier is preferably not more than 10 μm, more preferably not more than 1 μm. The particle size distribution is also desired to be narrow. The particle diameter of the carrier fed to the prepolymerization system may be relatively large, provided that the particle diameter of the carrier present in the prepolymerization system is small. That is, by the irradiation with the elastic wave, the carrier is destroyed in the prepolymerization system, and thereby the above-defined particle diameter can be obtained.

In the present invention, as the co-catalyst component [B], a compound selected from organoaluminum compounds, organoaluminum halide compounds, aluminum halide compounds, organoboron compounds, organoboron oxy-compounds, organoboron halide compounds, boron halide compounds and organoaluminum oxy-compounds is employed.

The above compounds, except the organoaluminum oxy-compounds, are represented by the following formula (ii):

$$BR_x \qquad (ii)$$

wherein B is an aluminum atom or a boron atom and x is a of the aluminum or the boron.

When the compound represented by the formula (ii) is an organoaluminum compound or an organoboron compound, R indicates an alkyl group of 1 to 30 carbon atoms.

When the compound represented by the formula (ii) is an aluminum halide compound or a boron halide compound, R indicates a halogen atom.

When the compound represented by the formula (ii) is an organoaluminum halide compound or an organoboron halide compound, R indicates both of an alkyl group of 1 to 30 carbon atoms and a halogen atom.

Examples of the halogen atoms include fluorine, chlorine, bromine and iodine. Examples of the alkyl groups of 1 to 30 carbon atoms include methyl, ethyl, propyl, isopropyl, butyl and isobutyl.

The organoaluminum oxy-compounds are represented by the following formula (iii) or (iv):

wherein R is a hydrocarbon group, such as methyl, ethyl, propyl or butyl, and m is an integer of 2 or more, preferably 5 to 40.

The aluminoxane mentioned above may be formed from mixed alykyloxyaluminum units consisting of alkyloxyaluminum units represented by the formula OAl (R$^1$) (wherein R$^1$ is the same group as indicated by R) and alkyloxyaluminum units represented by the formula OAl (R$^2$) (wherein R$^2$ is the same group as indicated by R but different from R$^1$).

A part of the groups indicated by R in the alkyloxyaluminum units may be each halogen, hydrogen, an alkoxy group, an aryloxy group or a hydroxyl group.

The above-mentioned co-catalysts [B] may be used singly or in combination of two or more kinds. The co-catalyst may be used after diluted with hydrocarbon or halogenated hydrocarbon.

In the present invention, the transition metal catalyst component [A] and the co-catalyst component [B] are used as the olefin polymerization catalyst. In addition, an electron donor may be optionally employed. Examples of the electron donors include ether compounds, carbonyl compounds and alkoxy compounds.

In the present invention, an olefin is polymerized onto the olefin polymerization catalyst in a heterogeneous system under irradiation with an elastic wave to prepare a prepolymerized solid catalyst. This polymerization is preferably carried out as a solid-liquid heterogeneous polymerization (slurry polymerization).

In the slurry polymerization process, the polymerization is conducted in such a state that the resulting polyolefin (prepolymerized catalyst) is suspended in a polymerization solvent.

In the prepolymerization system, the catalyst components may be dissolved in the polymerization solvent or the components may be slurried therein. Further, the catalyst components may be used together with a carrier by, for example, supporting them on the carrier, but in this case, the particle diameter of the carrier is desired to be not more than 10 µm as described above.

As the polymerization solvent, inert hydrocarbon or the reactive monomer itself can be used. Preferably used is aliphatic hydrocarbon or alicyclic hydrocarbon. Particularly preferably used is aliphatic hydrocarbon or alicyclic hydrocarbon having a boiling point of not higher than 100° C. The aliphatic hydrocarbons or the alicyclic hydrocarbons may be used in combination of two or more kinds.

The prepolymerization is carried out at a polymerization temperature of usually −20 to 150° C., preferably 0 to 120° C., particularly preferably 20 to 100° C., under a polymerization pressure of usually atmospheric pressure to 100 kg/cm$^2$, preferably atmospheric pressure to 50 kg/cm$^2$, particularly preferably atmospheric pressure to 20 kg/cm$^2$, and under such conditions that the resulting polymer is not dissolved in the polymerization solvent.

The prepolymerization is desirably carried out with maintaining the polyolefin concentration in the slurry at 10 to 250 g/liter, preferably 10 to 150 g/liter.

In the prepolymerization, the polymerization liquid may be cooled by an external heat exchanger to remove heat of polymerization, followed by circulation of the liquid in the reaction system.

The molecular weight of the resulting polyolefin (prepolymerized catalyst) can be adjusted by varying the polymerization conditions such as polymerization temperature or the amount of a molecular weight modifier (e.g., hydrogen) used.

In the process for preparing an olefin prepolymerized solid catalyst according to the invention, the prepolymerization can be stably achieved without adhesion of polyolefin to the wall surface of the reactor or without production of string-like polyolefin, to easily obtain the later-described prepolymerized solid catalyst.

In the process of the invention, the heterogeneous prepolymerization can be stably conducted even if the catalyst components are used without being supported on a carrier. If the catalyst components are used as they are without supporting them on the carrier to perform the heterogeneous polymerization and thereby prepare the prepolymerized solid catalyst, a step of preparing a solid catalyst prior to the polymerization process can be omitted. Therefore, loss of the expensive transition metal catalyst component can be avoided in the preparation of the solid catalyst.

The olefin prepolymerized solid catalyst according to the invention is characterized in that this prepolymerized solid catalyst is prepared by prepolymerizing an olefin onto an olefin polymerization catalyst in a heterogeneous system under irradiation with an elastic wave and that the olefin is prepolymerized in an amount of not less than 0.1 g based on 1 mmol of the transition metal contained in the olefin polymerization catalyst.

The prepolymerized solid catalyst is prepared by the process for preparing a prepolymerized solid catalyst as specifically mentioned above. In the prepolymerized solid catalyst, the amount of the olefin prepolymerized onto the olefin polymerization catalyst in a heterogeneous system under irradiation with an elastic wave is not less than 0.1 g, preferably 1 to 10,000 g, more preferably 10 to 5,000 g, particularly preferably 10 to 1,000 g, based on 1 mmol of the transition metal contained in the olefin polymerization catalyst.

The prepolymerized solid catalyst may be in the form of particles or clusters of the particles. When the prepolymerized solid catalyst is in the form of particles, the particle diameter is usually not more than 50 µm, preferably 1 to 20 µm. The solid particles may be in the spherical form or in other form than the spherical form.

The prepolymerized solid catalyst may be in the form of clusters formed from the above-mentioned particles gathered. There is no specific limitation on the shape of each cluster, and the particles which form each cluster may be connected or may not be connected to each other. For example, the particles may be polymer-bonded to each other or the polymer portions of the particles may be fusion-bonded, to form cotton-like agglomerates.

There is no specific limitation on the size of the clusters, but the size thereof is in the range of usually 10 to 10,000 µm, preferably 30 to 1,000 µm.

The prepolymerized solid catalyst according to the invention has excellent catalytic properties and shows high performance, so that it is very useful as a solid catalyst for heterogeneous polymerization such as slurry polymerization or gas phase polymerization.

Process for Heterogeneous Polymerization of Olefin

In the process for heterogeneous polymerization of an olefin according to the invention, an olefin is subjected to slurry polymerization or gas phase polymerization (heterogeneous main polymerization) in the presence of the prepolymerized solid catalyst obtained as above. The slurry polymerization or the gas phase polymerization is carried out under the conditions conventionally known. The above-described heterogeneous prepolymerization step conducted under irradiation with an elastic wave can be continued to the main polymerization step so as to prepare final polyolefin (final product).

The slurry polymerization or the gas phase polymerization in the presence of the prepolymerized solid catalyst can be practiced in accordance with known methods using a solid catalyst.

If the main polymerization conducted without irradiation with an elastic wave is slurry polymerization, it is feasible to stop the irradiation with the elastic wave after completion of the prepolymerization and to continue the slurry polymerization, or it is also feasible to transfer the prepolymerized solid catalyst into another reactor and to perform slurry polymerization therein.

Examples of the olefins employable in the polymerization include α-olefins of 2 to 20 carbon atoms, such as ethylene, propylene, 1-butene, 1-pentene, 1-hexene, 4-methyl-1-pentene, 1-octene, 1-decene and 1-dodecene. These α-olefins may be homopolymerized or copolymerized. The α-olefin used in the polymerization may be the same as or different from olefin used in the prepolymerization.

The α-olefin may be copolymerized with the aforesaid dienes, if needed.

In the polymerization step, such olefin polymerization catalyst components as used in the preparation of the prepolymerized solid catalyst can be appropriately added, if needed, in addition to the prepolymerized solid catalyst.

The polymerization is carried out at a polymerization temperature of usually −20 to 150° C., preferably 0 to 120° C, particularly preferably 20 to 100° C., under a polymerization pressure of usually atmospheric pressure to 100 kg/cm$^2$, preferably atmospheric pressure to 50 kg/cm$^2$, particularly preferably atmospheric pressure to 20 kg/cm$^2$.

The gas phase portion or the polymerization liquid may be cooled by an external heat exchanger to remove heat of polymerization, followed by circulation of the gas phase portion or the polymerization liquid.

The molecular weight of the resulting polyolefin can be adjusted by varying the polymerization conditions such as polymerization temperature or the amount of a molecular weight modifier (e.g., hydrogen) used.

According to the process for heterogeneous polymerization of an olefin of the invention, polymerization can be stably achieved without adhesion of polyolefin to the wall surface of the reactor.

According to the process for heterogeneous polymerization of an olefin of the invention, further, polyolefin particles of uniform property and high quality can be obtained.

EFFECT OF THE INVENTION

According to the process for preparing a prepolymerized solid catalyst of the invention, a prepolymerized solid catalyst in the form of particles and/or clusters of the particles can be easily obtained without adhesion of polyolefin to the wall surface of the reactor or without production of string-like polyolefin.

The prepolymerized solid catalyst according to the invention shows high performance. When the prepolymerized solid catalyst is used, heterogeneous polymerization of an olefin can be stably carried out, and besides polyolefin particles of uniform property and high quality can be obtained.

EXAMPLE

The present invention will be further described with reference to the following examples, but it should be construed that the invention is in no way limited to those examples.

In the following examples, the average particle diameter of the produced polyolefin was determined in the following manner. The polyolefin particles were observed by a scanning electron microscope to measure particle diameters of 100 or more particles, and the measured particle diameters were weight-averaged. As each of the particle diameters, the maximum length of Pythagorean law was measured from the particle image. That is, the particle image was put between two parallel lines in each of the horizontal and the vertical directions to measure the length of the particle image in the horizontal direction (horizontal length) and in the vertical direction (vertical length), and the particle diameter was calculated by the following equation.

$$\text{Particle diameter} = ((\text{Horizontal length})^2 + (\text{Vertical length})^2)^{0.5}$$

Using the particle diameter, the weight-average particle diameter was calculated by the following equation:

$$\text{Average particle diameter} = \Sigma^4 / \Sigma nd^3$$

wherein n is the number of particles, and d is a particle diameter.

The average particle diameter was determined for each of the prepolymerized solid catalyst in the form of particles and that in the form of clusters.

Example 1

Preparation of Propylene Prepolymerized Catalyst

In a 1-liter glass autoclave (reactor) equipped with a stirring blade, prepolymerization of propylene was carried out under irradiation with an ultrasonic wave, as shown in FIG. 1.

That is, in an atmosphere of nitrogen, to the reactor were introduced, from the top thereof, 0.35 liter of dehydrated and purified hexane, a toluene slurry of methylaluminoxane in such an amount that the aluminum concentration became 72 mmol/liter-polymerization volume and triisobutylaluminum in such an amount that the aluminum concentration became 10 mmol/liter-polymerization volume.

Further, a toluene solution of rac-dimethylsilylbis(2-methyl-4-phenyl-1-indenyl) zirconium dichloride was introduced in such an amount that the zirconium concentration became 0.24 mmol/liter-polymerization volume.

Furthermore, toluene was introduced so that the total amount of the solvent became 0.5 liter. Then, nitrogen was purged out from the reactor with propylene, and prepolymerization was carried out for 2 hours at room temperature (25 to 30° C.) under the total pressure of 0 to 0.1 kg/cm$^2$-G. During the 2-hour prepolymerization reaction, 30 g of propylene was fed to the system.

Throughout the above prepolymerization, the reaction system was irradiated, from the outside of the reactor, with an ultrasonic wave having a frequency of 38 kHz at an intensity of 0.08 W/cm$^2$ on the reactor wall. The prepolymerization was able to be stably achieved without adhesion of a polymer to the wall surface of the reactor.

After the reactor was purged with nitrogen, the slurry containing the produced prepolymerized catalyst (polypropylene containing catalyst components) was drawn out of the reactor and separated into the solvent and the prepolymerized catalyst through a glass filter. Then, the prepolymerized catalyst was decanted four times with hexane of 20 ml per 1 g of the prepolymerized catalyst. Thus, polypropylene (prepolymerized catalyst) in the form of spherical particles having a particle diameter of 7 μm was obtained.

The polypropylene thus obtained had an intrinsic viscosity [η], as measured in decalin at 135° C., of 1.7 dl/g and a melting point of 157° C.

Comparative Example 1
Prepolymerization of Propylene

Prepolymerization was carried out in the same manner as in Example 1, except that the irradiation with an ultrasonic wave was not practiced. As a result, adhesion of a polymer to the wall surface and the stirrer was observed, and stable prepolymerization was unable to be achieved.

Example 2
Polymerization of Propylene

Slurry polymerization of propylene was carried out using, as a prepolymerized catalyst, the polypropylene obtained in Example 1.

That is, in an atmosphere of nitrogen, to a 2-liter stainless steel autoclave (reactor) equipped with a stirring blade were introduced, from the top thereof, 0.75 liter of dehydrated and purified hexane and triisobutylaluminum in such an amount that the aluminum concentration became 1 mmol/liter-polymerization volume. Further, the prepolymerized catalyst obtained in Example 1 was introduced in such an amount that the zirconium concentration became 0.004 mmol/liter-polymerization volume.

Then, nitrogen was purged out from the reactor with propylene, and polymerization was carried out for 1 hour at a temperature of 70° C. under the total pressure of 5 kg/cm$^2$. The polymerization was able to be stably achieved without adhesion of a polymer to the wall surface of the reactor.

After the polymerization, the slurry was drawn out of the reactor and separated into the solvent and polypropylene through a glass filter. Then, the polypropylene was dried.

Thus, 230 g of polypropylene in the form of spherical particles having a particle diameter of 30 μm was obtained. The polypropylene had an intrinsic viscosity [η], as measured in decalin at 135°C., of 3.6 dl/g and a melting point of 152° C.

Comparative Example 2
Polymerization of Propylene

Polymerization was carried out in the same manner as in Example 2, except that to the reactor were introduced a toluene slurry of methylaluminoxane in such an amount that the aluminum concentration became 0.5 mmol/liter-polymerization volume and rac-dimethylsilylbis(2-methyl-4-polymerization zirconium dichloride in such an amount that the zirconium concentration became 0.001 mmol/liter-polymerization volume, in place of the prepolymerized catalyst obtained in Example 1.

As a result, adhesion of a polymer to the wall surface and the stirrer was observed. Besides, a string-like polymer was produced. Therefore, stable polymerization was unable to be achieved. Comparative Example 3
Polymerization of Propylene Polymerization was carried out in the same manner as in Example 2, except that a carrier supported type catalyst, in which methylaluminoxane and rac-dimethylsilylbis(2-methyl-4-phenyl-1-indenyl)zirconium dichloride were supported on SiO$_2$ having an average particle diameter of 50 μm and propylene was prepolymerized, was introduced to the reactor in such an amount that the zirconium concentration became 0.006 mmol/liter-polymerization volume in place of the prepolymerized catalyst obtained in Example 1.

The yield of polypropylene was 210 g, and this polypropylene had an intrinsic viscosity [η], as measured in decalin at 135° C., of 3.2 dl/g. The melting point of the polypropylene was 148°C., which was lower than the melting point of the polypropylene obtained in Example 2.

Example 3
Preparation of Ethylene Prepolymerized Catalyst

In the same 1-liter glass autoclave (reactor) equipped with a stirring blade as used in Example 1, prepolymerization of ethylene was carried out under irradiation with an ultrasonic wave.

That is, in an atmosphere of nitrogen, to the reactor were introduced, from the top thereof, 0.5 liter of dehydrated and purified hexane, a hexane slurry of methylaluminoxane in such an amount that the aluminum concentration became 50 mmol/liter-polymerization volume and triisobutylaluminum in such an amount that the aluminum concentration became 10 mmol/liter-polymerization volume.

Further, a hexane solution of bis(1,3-dimethylcyclopentadienyl) zirconium dichloride was introduced in such an amount that the zirconium concentration became 0.10 mmol/liter-polymerization volume.

Furthermore, hexane was introduced so that the total amount of the solvent became 1.0 liter. Then, nitrogen was purged out from the reactor with ethylene, and prepolymerization was carried out for 1 hour at room temperature (25 to 30° C.) under the total pressure of 3.0 kg/cm$^2$-G. During the 1-hour prepolymerization reaction, 8 g of ethylene was fed to the system.

Throughout the above prepolymerization, the reaction system was irradiated, from the outside of the reactor, with an ultrasonic wave having a frequency of 38 kHz at an intensity of 0.10 W/cm$^2$ on the reactor wall. The prepolymerization was able to be stably achieved without adhesion of a polymer to the wall surface of the reactor.

After the reactor was purged with nitrogen, the slurry containing the produced prepolymerized catalyst (polyethylene containing catalyst components) was drawn out of the reactor and separated into the solvent and the prepolymerized catalyst through a glass filter. Then, the prepolymerized catalyst was decanted four times with hexane of 20 ml per 1 g of the prepolymerized catalyst. Thus, clusters (prepolymerized catalyst) having a size of 550 μm formed from gathered polyethylene particles having a particle diameter of 1.3 μm were obtained. The gathered particles were bonded to each other with their polymer portions to form cotton-like agglomerates.

The polyethylene thus obtained had an intrinsic viscosity [η], as measured in decalin at 135° C., of 1.1 dl/g.

Example 4
Polymerization of Ethylene

Slurry polymerization of ethylene was carried out using, as a prepolymerized catalyst, the polyethylene obtained in Example 3.

That is, in an atmosphere of nitrogen, to a 2-liter stainless steel autoclave (reactor) equipped with a stirring blade were introduced, from the top thereof, 0.75 liter of dehydrated and purified hexane and triisobutylaluminum in such an amount that the aluminum concentration became 1 mmol/liter-polymerization volume. Further, the prepolymerized catalyst obtained in Example 3 was introduced in such an amount that the zirconium concentration became 0.01 mmol/liter-polymerization volume.

Then, nitrogen was purged out from the reactor with ethylene, and polymerization was carried out for 2 hours at a temperature of 60° C. under the total pressure of 8.0 kg/cm$^2$. The polymerization was able to be stably achieved without adhesion of a polymer to the wall surface of the reactor.

After the polymerization, the slurry was drawn out of the reactor and separated into the solvent and polyethylene through a glass filter. Then, the polyethylene was dried.

Thus, 150 g of agglomerates having a size of 700 μm formed from gathered polyethylene particles having a particle diameter of 6 μm were obtained.

The polyethylene thus obtained had an intrinsic viscosity [η], as measured in decalin at 135° C., of 1.9 dl/g.

What is claimed is:

1. A process for preparing a prepolymerized solid catalyst containing a prepolymerized olefin, said process comprising polymerizing an olefin onto an olefin polymerization catalyst in a heterogeneous system under irradiation with an elastic wave.

2. A process for heterogeneous polymerization of an olefin, comprising subjecting an olefin to slurry polymerization or gas phase polymerization in the presence of a prepolymerized solid catalyst, said prepolymerized solid catalyst having been prepared by prepolymerizing an olefin onto an olefin polymerization catalyst in a heterogeneous system under irradiation with an elastic wave and in which the olefin is prepolvmerized in an amount of not less than 0.1 g based on 1 mmol of a transition metal contained in the olefin polymerization catalyst.

3. A process for heterogeneous polymerization of an olefin, comprising polymerizing an olefin onto an olefin polymerization catalyst in a heterogeneous system under irradiation with an elastic wave.

* * * * *